April 29, 1930.    G. C. HURRELL    1,756,198
HOMOGENIZING MACHINE
Filed Oct. 9, 1925    2 Sheets-Sheet 1
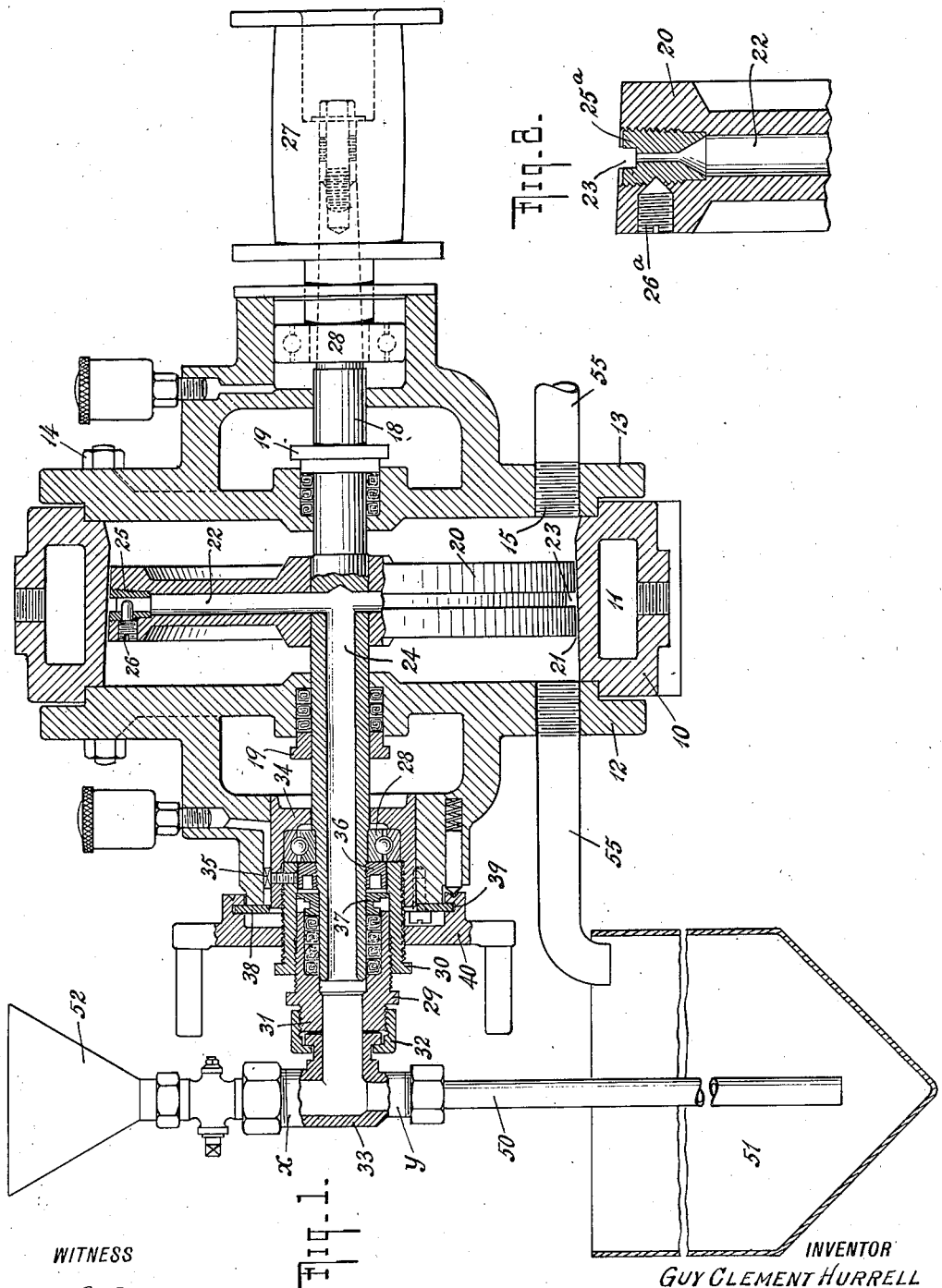
WITNESS
INVENTOR
GUY CLEMENT HURRELL
BY
ATTORNEYS April 29, 1930.  G. C. HURRELL  1,756,198
HOMOGENIZING MACHINE
Filed Oct. 9, 1925   2 Sheets-Sheet 2
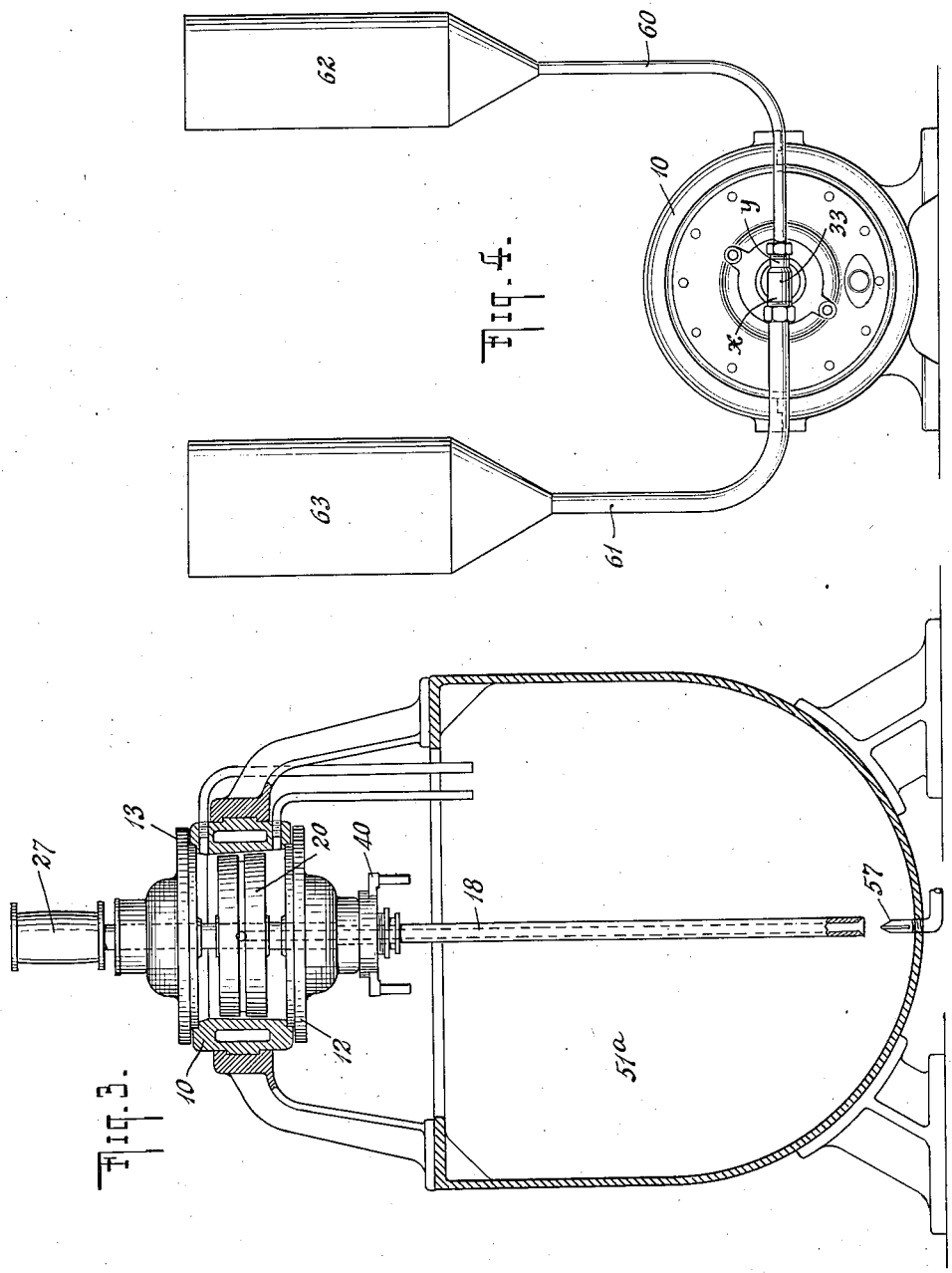
WITNESS
G. V. Rasmussen
INVENTOR
GUY CLEMENT HURRELL
BY
Biesen & Schrenk
ATTORNEYS Patented Apr. 29, 1930

1,756,198

UNITED STATES PATENT OFFICE

GUY CLEMENT HURRELL, OF LONDON, ENGLAND

HOMOGENIZING MACHINE

Application filed October 9, 1925. Serial No. 61,395.

This invention relates to that class of machines known as homogenizers such as disclosed in United States Patent No. 1,496,641, granted to me, June 3, 1924, and in which liquids to be emulsified, or solids in liquid suspension to be disintegrated, are passed in a thin sheet or film between a narrow gap formed by two substantially smooth bounding surfaces which are rapidly revolved with respect to one another. In the use of these machines, it is necessary with certain kinds of materials to regulate the time during which the material is subjected to treatment in the machine, this being accomplished with the machine shown in said patent by controlling the rate of flow of the material through the gap by a regulation of the time rate of feed of the material to the machine. While this method of regulation is satisfactory for some materials, it is, however, not adapted for other materials because of the presence of entrained air due to the decrease of the volume, or the interruption of the column of material fed to the working gap of the machine. One of the principal objects of the present invention is to provide a machine of the class described with means for automatically returning the material to the working gap of the machine for further and repeated treatment. Another object is to provide a machine of the character set forth with means for insuring that the materials to be treated will be kept free from entrained air from the time such materials enter the machine until they emerge from the narrow working gap thereof.

These and other objects will be apparent to those skilled in the art to which the invention relates from the following more detailed description and by reference to the accompanying drawings forming a part hereof, and wherein Fig. 1 is a central longitudinal section through a homogenizing machine embodying the principles of my invention; Fig. 2 is a sectional detail; Fig. 3 is a central vertical section showing a material feeding attachment for use with the machine when it is mounted for rotation about a vertical axis and Fig. 4 is an end elevation of a machine provided with an attachment for the simultaneous feeding of two different materials to be mixed or emulsified.

The homogenizing machine as shown most clearly in Fig. 1 consists of stator and rotor elements having opposed cooperating working surfaces spaced apart to provide a narrow working gap. In the example illustrated, the stator element is formed by a cylinder 10, the walls of which are hollow or jacketed as indicated at 11, to permit the circulation of a heating or cooling medium for controlling the temperature at which the material is to be treated. The ends of said cylinder are closed by the covers 12 and 13 secured to the cylinder by any suitable means such as the bolts 14. The covers 12 and 13 are provided with outlets 15 through which the treated material may be discharged. A shaft 18 axially located with respect to the cylinder 10 and its covers 12, 13 passes through and is rotatably supported within said covers, which are provided with stuffing boxes 19 for preventing leakage about said shaft. The inner wall of the cylinder 10 is slightly tapered and forms one of the working surfaces of the machine, with which the oppositely tapered outer circumference of the cylindrical rotor element 20, mounted on the shaft 18, cooperates to form the narrow working gap 21 in which the material is treated. The rotor element 20 is provided with one or more radially extending conduits 22 which furnish communication between an annular channel 23, formed in the outer circumference of said rotor, and the central bore 24 provided in the shaft 18; the conduits 22, in whatever number they may be present in the machine, have their discharge ends substantially restricted for instance by a nozzle bushing 25, the opening of which may itself be adjustably restricted by means such as the screw 26 shown in Fig. 1. In practice it is preferred to restrict the number of conduits 22 and their nozzle openings to a minimum in order to secure the greatest operative efficiency in the machine, a single conduit and nozzle opening in some cases being sufficient for the purpose. It will be understood however that the number of conduits and nozzle openings may be varied as required to secure the best results in each case. The shaft 18 is extended outwardly beyond the covers 12, 13, and one end thereof has secured to it a pulley 27 which may be driven by a belt from any suitable source of power (not shown). Ball bearings, or other suitable anti-friction bearings, 28, are provided between the shaft 18 and covers 12, 13.

The central bore 24 of the shaft 18 extends to one or both ends of the shaft for permitting the introduction or feeding of the material to be treated to the working gap of the machine. In the example illustrated in Fig. 1, the end of the shaft that is open to the bore 24 terminates within an air tight gland 29 of a stuffing box 30; said gland having its outer end 31 reduced and threaded for receiving a nut 32 which serves to connect the T coupling 33 to the machine. The stuffing box 30 in which the gland 29 is screwed has its outer circumference screw-threaded and is screwed into the threaded end of the bore of a sliding housing 34, a set screw 35 being provided to prevent relative rotation of said stuffing box and housing after the parts are assembled. A nut 36 in screwthreaded engagement with the shaft 18 holds the inner and rotating part of bearing 28 against a shoulder formed on the shaft, and thereby fixes the shaft in the housing 34 against displacement in an axial direction, ordinary radial ball bearings of commerce such as are shown at 28 being satisfactory to withstand the very small axial thrust in addition to resisting the radial load. An annular member 37 is placed in the back of the stuffing box 30 and engages a small abutment which is formed in the bore of the latter in such a position that the member 37 is prevented thereby from coming in contact with the face of nut 36 notwithstanding the thrust of the packing material when this is compressed by screw gland 29. A handwheel 40 is mounted upon the cover 12 in such a way that it may be rotated but is restrained against axial displacement by means, for example, of a combination of an annular groove 39 in the handwheel and quadrants, or pieces of flat plates 38 fixed by suitable means to the cover and having their outer ends disposed in the groove 39. The hand wheel 40 is provided with a threaded bore which engages the outer screwthreaded circumference of the stuffing box 30. As the hand wheel 40 is held against longitudinal movement by the plates 38, rotation of said wheel will, because of its screwthreaded engagement with the stuffing box 30, cause said stuffing box and the sliding housing 34 connected thereto to be moved longitudinally, thus producing, through the ball bearing 28 corresponding movement of the shaft 18. The latter carries the rotor 20 with it in its longitudinal movement, and according to the direction thereof, increases or decreases the gap 21.

Since there is only a negligible amount of end thrust to be absorbed between the fixed and moving elements of the machine, ordinary annular ball bearings are employed, the inner ring being fixed to the shaft by nut 36 and the outer or fixed part secured in the housing 34 by the stuffing box 30. This elimination of end thrust is an important feature of the invention and is secured by placing the radial conduit or conduits 22 and groove 23 substantially in the midlength of the working face of rotor 20 so that the stream of liquid passing the working gap 21 is divided and passes half in each axial direction and the thrust set up by the flow of liquid is neutralized in the rotor itself. The very small amount of conicity (sufficient for adjustment only, for example—1 in 25 or 1 in 50) eliminates end thrust, which would result if co-acting surfaces of wide conicity were used, the axial thrust being at a maximum in the case of a pair of discs and at a minimum in the case of a parallel cylinder. When the adjustment feature of the invention is not required, as may be the case for certain processes or manufactures, the co-acting surfaces may actually be parallel.

Various forms of attachments may be employed for feeding to the machine the material to be treated, depending on the nature of the material and also on whether the machine is operated on a horizontal axis or a vertical axis. In the form shown in Fig. 1, with the machine mounted on a horizontal axis, the T-coupling 33 has secured to the lower branch Y thereof a pipe 50 which projects downwardly into, and preferably terminated near the bottom of the tank 51. The upper branch $x$ of said coupling has secured thereto a hopper 52 through which a sufficient amount of liquid may be introduced into the bore 24 of the shaft 18 to fill said bore and the conduits 22 of the rotor element to prime the device.

The operation is as follows: The tank 51 being charged with a supply of the material to be treated, the machine is primed through the hopper 52. The rotation of the rotor at high speed will cause the liquid contained within the conduits 22 to be subjected to a very great centrifugal force and to be ejected through the restricted nozzles 25 or 25$^a$ into the working gap 21. At the same time, suction will be created at the inner ends of the radial conduits which will cause a further and continuous supply of liquid to be drawn into the hollow bore 24 of the shaft 18 through the pipe 50 from the tank 51. If it is desired to return the liquid after it is passed through the machine to the tank 51 for further treatment, discharge spouts 55 are connected to the openings 15 to lead the material back to said tank.

If the machine is mounted to rotate upon a vertical axis, the material to be treated may be fed directly to the bore 24 of the shaft 18 from a hopper arranged above and communicating with said bore the liquid being fed to said hopper at a sufficient rate to keep said bore filled.

Another arrangement of a vertical shaft machine is shown in Fig. 3 in which the open end of the bore 24 of the shaft 18 is extended downwardly into and terminates slightly above the bottom of the tank 51ª. In this arrangement, the machine may be primed by means of an injector jet 57 or in any other suitable way, such for example as extending the hollow bore to the upper end of the shaft.

In Fig. 4, I have shown a suitable arrangement for emulsifying two or more liquids, the T-coupling 33 having the branches x, y thereof extending horizontally. Pipes 60 and 61 leading from the supply tanks 62 and 63 respectively are connected to said branches. Where the materials to be treated contain solids in suspension and where it is desired to return the materials to the machine for further treatment, the sizes of the tanks 51, 51ª are so arranged that sufficient time is allowed for the selective action of sedimentation, levigation, or elutriation to take effect; the coarser particles or the denser particles sink to the bottom of the tank and are withdrawn through the suction pipe and returned to the machine. The drawing of the material from the lower part of the tank by suction effectively prevents air from being entrained and the maintenance of an unbroken or uninterrupted column of liquid also insures the continuous automatic feeding of the material. The rate of feed of the material through the machine may be readily controlled for different materials by changing the adjustment of the screws 26 in Fig. 1, access to which may be had through the left hand outlet 15, or by selecting nipples 25ª with suitably dimensioned orifices, said nipples 25ª as shown in Fig. 2 being removably secured in place by means of a locking screw 26ª.

It will be understood that the constructions shown and described herein are merely illustrative and that many changes, variations, and modifications may be resorted to without departing from the spirit of my invention. It will be understood further that the attachments for feeding the material to the working gap of the machine are not limited in their application to the specific machine herein illustrated, but that they may be employed with many different machines of the general character to which this invention relates.

I claim:

1. The combination with a homogenizing machine having a pair of working surfaces arranged closely adjacent to one another to form a narrow gap through which the material to be treated is forced by centrifugal force, means to produce a rapid relative rotation of said surfaces and thereby establishing the centrifugal force aforesaid and simultaneously setting up a suction effect in the material on its way to the narrow gap, of means including said centrifugally developed suction for automatically returning the material to said machine for retreatment after it has been discharged from said machine.

2. In a homogenizing machine, stator and rotor members having circumferential working surfaces spaced apart to provide a narrow gap in which the material is treated and through which it is passed, said rotor member having a passage terminating in at least one radially extending conduit through which the material is fed to said gap means whereby said passage may be initially filled with the material to be treated, and means cooperating with the forces created by the revolution of the rotor for automatically returning the material to said passage and then to said gap for retreatment, while maintaining an uninterrupted column of material within said passage and thereby avoiding the presence in said material of entrained air.

3. In a homogenizing machine, stator and rotor members having their outer circumferential surfaces spaced apart to provide a narrow gap through which the material to be treated is passed, said rotor member having a radially extending conduit provided at its discharge end with a nozzle of smaller cross sectional area than said conduit, and means to rotate said rotor at a high speed to cause the material to be ejected through said nozzle into said gap.

4. In a homogenizing machine, cylindrical stator and rotor members having their outer circumferential surfaces spaced apart to provide a narrow gap through which the material to be treated is passed, said rotor member having a plurality of radially extending conduits, each of said conduits having at the discharge end thereof a nozzle of smaller cross sectional area than its respective conduit, and means to rotate said rotor at a high speed to cause the material to be ejected through said nozzle into said gap.

5. In a homogenizing machine, stator and rotor members having their outer circumferential surfaces spaced apart to provide a narrow gap through which the material to be treated is passed, said rotor member having a radially extending conduit provided at its discharge end with a nozzle of smaller cross sectional area than said conduit, means to rotate said rotor at a high speed to cause the material to be ejected through said nozzle into said gap, and means for regulating the effective cross sectional area of said nozzle.

6. In a homogenizing machine, stator and rotor members having their working surfaces spaced apart to provide a narrow gap through which the material to be treated is passed, said rotor member being provided with a conduit through which the material is passed to said gap, means whereby said conduit may be initially filled with material to be treated, a tank for receiving a supply of the material, an uninterrupted connection leading directly from said tank and conduit, to said treated means to rotate said rotor member rapidly for causing the material within said conduit to be ejected into said gap and for producing a suction within said connection for automatically, after a short preliminary period withdrawing the material from said tank and for maintaining an uninterrupted column of material within said conduit to thereby avoid the presence in said material of entrained air.

7. In a homogenizing machine, stator and rotor members having opposed working faces spaced apart to provide a narrow gap through which the material to be treated is passed, a hollow shaft upon which said rotor member is mounted, a radially extending conduit leading from the bore of said shaft to said gap, means whereby said hollow shaft may be initially filled with material to be treated, a tank for receiving a supply of treated material located below said shaft, a pipe leading from said tank to the center of said hollow shaft, and means to rotate said rotor rapidly to eject material from said conduit into said gap and to create a suction for continuously and automatically, after a short preliminary period, drawing material from said tank through said pipe and shaft to said conduit and for maintaining an uninterrupted column of material within said conduit to thereby avoid the presence in said material of entrained air.

8. In a homogenizing machine, stator and rotor members having opposed working faces spaced apart to provide a narrow gap through which the material to be treated is passed, a hollow shaft upon which said rotor member is mounted, a radially extending conduit leading from the bore of said shaft to said gap, means whereby said hollow shaft may be initially filled with material to be treated, a tank for receiving a supply of treated material located below said shaft, a pipe leading upwardly from said tank to the bore of said hollow shaft, means to rotate said rotor hollow shaft rapidly to eject material from said conduit into said gap and to create a suction for continuously and automatically, after a short preliminary period, drawing material from said tank through said pipe and shaft to said conduit, and a discharge pipe for returning to said tank material which had passed through said gap.

9. In a homogenizing machine, stator and rotor members having opposed working faces spaced apart to provide a narrow gap through which the material to be treated is passed, a hollow shaft upon which said rotor member is mounted, a radially extending conduit leading from said shaft to said gap, a tank for receiving a supply of treated material located below said shaft, a pipe connected to said hollow shaft and terminating adjacent to the bottom of said tank, means for preliminarily filling said hollow shaft and conduits with liquid, and means for rapidly rotating said rotor to cause the liquid contained in said conduit and shaft to be ejected into said gap and to create a suction in said hollow shaft and pipe for continuously drawing material from said tank through said shaft and pipe.

10. In a homogenizing machine, a stationary housing having a tapered cylindrical working surface, a rotor element having a tapered cylindrical working surface opposed to and slightly spaced from said first named surface to provide a narrow working gap through which the material to be treated is passed, a hollow shaft upon which said rotor is mounted, a radially extending conduit in said rotor communicating with the bore of said hollow shaft, a tank for receiving a supply of treated material, located below said shaft, a pipe communicating with said shaft and leading to said tank and a discharge conduit connected with said housing and leading from below the surface of the material in said tank for delivery to said tank material which has passed through said gap.

In testimony whereof I have hereunto set my hand.

GUY CLEMENT HURRELL.